Feb. 28, 1961 R. A. FRANZ 2,973,148
CROP GUARD FOR SPRINKLERS
Filed May 14, 1958 2 Sheets-Sheet 1
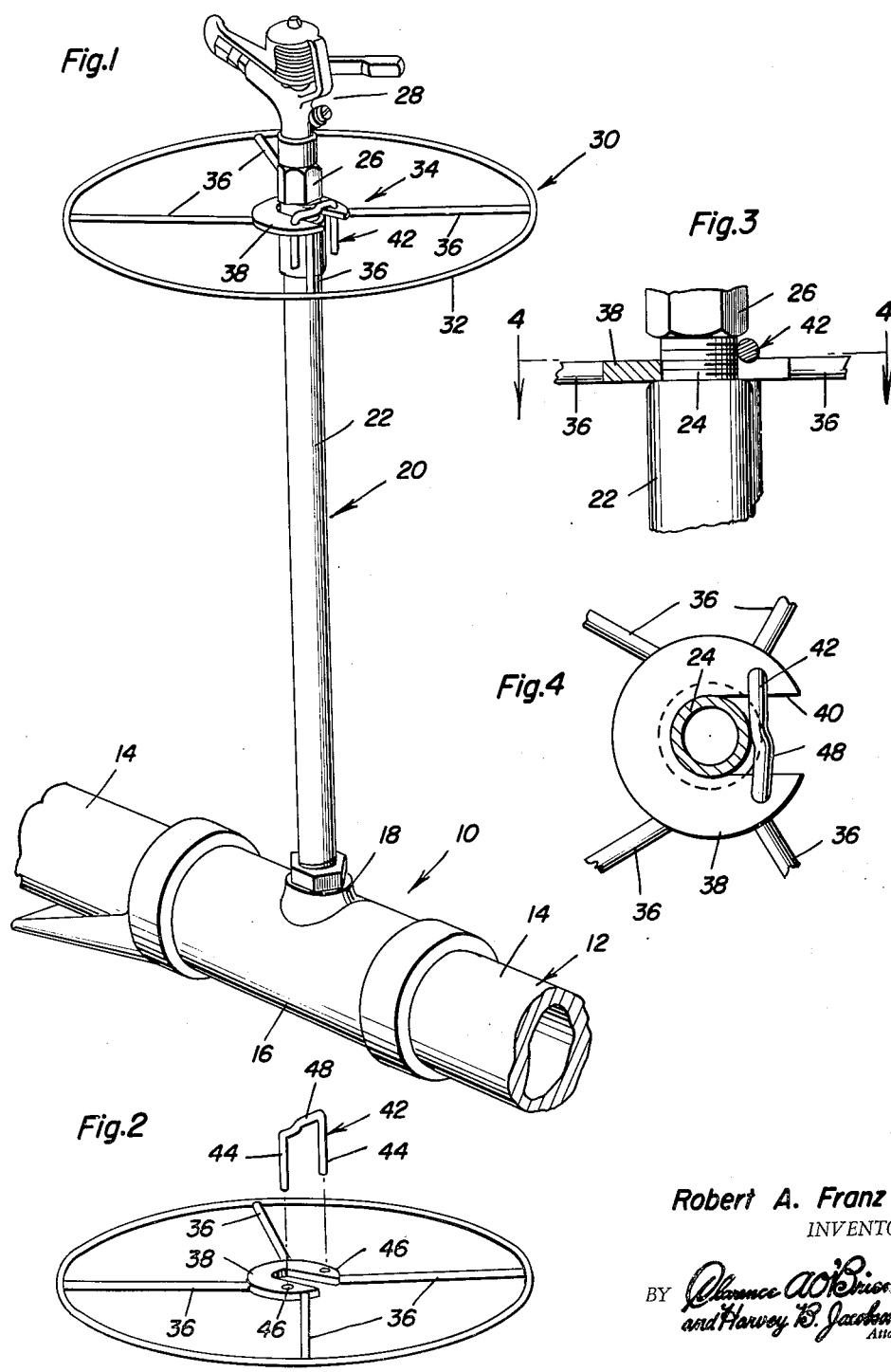
Robert A. Franz
INVENTOR.

Feb. 28, 1961  R. A. FRANZ  2,973,148
CROP GUARD FOR SPRINKLERS
Filed May 14, 1958  2 Sheets-Sheet 2
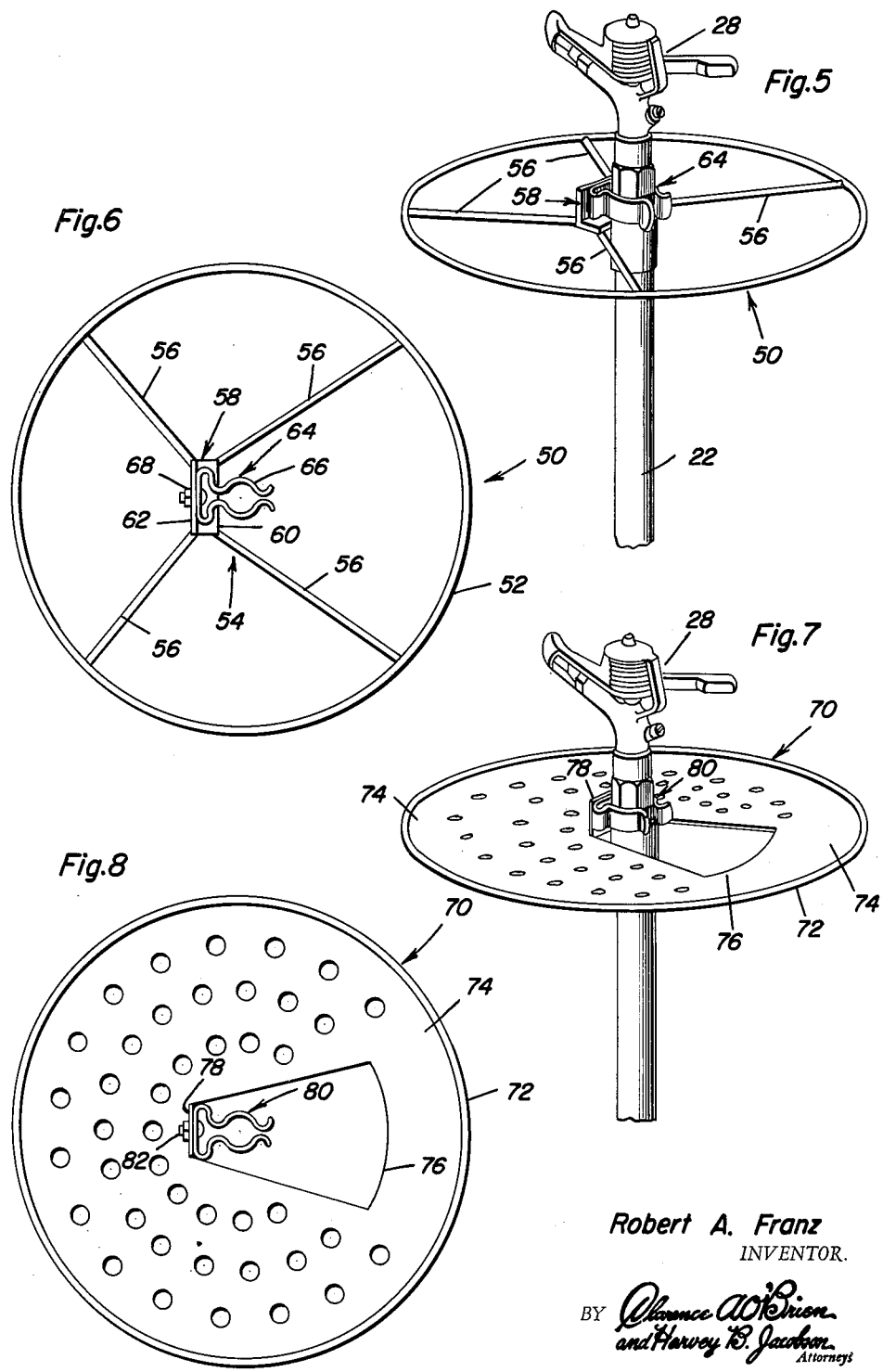
Robert A. Franz
INVENTOR.

United States Patent Office 2,973,148
Patented Feb. 28, 1961

2,973,148

CROP GUARD FOR SPRINKLERS

Robert A. Franz, Schrag, Wash.
(Rte. 1, Box 133W, Ritzville, Wash.)

Filed May 14, 1958, Ser. No. 735,198

6 Claims. (Cl. 239—230)

This invention relates in general to new and useful improvements in attachments for irrigation sprinklers, and more specifically to a crop guard for irrigation sprinklers.

The normal irrigation sprinkler includes a main supply pipe which has extending upwardly therefrom at intervals sprinklers which include upstanding pipes terminating in sprinkler nozzles. The nozzles may be of various types, although generally they rotate to properly spray the water over a large area. Such nozzles operate in the desired manner until such time as the crop becomes very high. In such event, the crop, especially when it is growing closely adjacent the sprinkler, will become engaged with the nozzle and disrupt the operation thereof. It is therefore the primary object of this invention to provide a guard which may be placed upon a sprinkler pipe for protecting the sprinkler nozzle from the crop.

Another object of this invention is to provide a guard which may be placed upon a sprinkler pipe for the purpose of protecting the nozzle of the sprinkler from the crop growing about the sprinkler, the sprinkler guard being so constructed whereby it may be slipped onto the sprinkler pipe without removing any part of the sprinkler.

Another object of this invention is to provide a guard for protecting sprinkler nozzles from growing crops, the guard being of an extremely simple construction and formed of readily obtainable inexpensive materials whereby the manufacture and use thereof is economically feasible.

A further object of this invention is to provide a guard for the sprinkler nozzles of irrigation sprinklers, the guard being mounted beneath the sprinkler nozzle and of a size to prevent a growing crop from becoming engaged with the sprinkler nozzle and thus disrupt the operation thereof, the guard being of such a construction whereby it may be easily positioned and removed and at the same time may be rigidly affixed to a sprinkler pipe.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of an irrigation sprinkler system, one sprinkler only being shown and there being mounted on the sprinkler one of the crop guards which is the subject of this invention;

Figure 2 is a perspective view of the crop guard removed from the sprinkler pipe and shows the specific details thereof;

Figure 3 is an enlarged fragmentary vertical sectional view taken through the crop guard and shows the specific connection between the crop guard and the sprinkler;

Figure 4 is an enlarged fragmentary horizontal sectional view taken substantially upon the plane indicated by the section line 4—4 of Figure 3 and shows further the details of the connection between the crop guard and the sprinkler;

Figure 5 is a fragmentary perspective view of the sprinkler with a modified form of crop guard mounted thereon;

Figure 6 is an enlarged top plan view of the crop guard of Figure 5 and shows the specific details thereof;

Figure 7 is a fragmentary perspective view showing the sprinkler with still another form of crop guard mounted thereon; and Figure 8 is an enlarged top plan view showing further the details of the crop guard of Figure 7.

Referring now to the drawings in detail, it will be seen that there is illustrated a portion of an irrigation sprinkler system which is referred to in general by the reference numeral 10. The irrigation sprinkler system 10 includes at least one elongated supply pipe 12 which is formed in a plurality of sections 14 connected together by couplings 16. Each of the couplings 16 is provided with a fitting 18 carrying a sprinkler which is referred to in general by the reference numeral 20. It is to be understood that the sprinklers 20 and other components of the irrigation system 10 are conventional and are in themselves not a part of this invention.

Each sprinkler 20 includes an upstanding riser pipe 22 which terminates at the upper end thereof in a reduced externally threaded portion 24 on which there is mounted by means of a fitting 26 a sprinkler nozzle 28. The sprinkler nozzle 28 may be of any type although the one illustrated is a rotating sprinkler nozzle.

In order that a growing crop may not interfere with the operation of the sprinkler nozzle 28, there is provided a first form of crop guard which is referred to in general by the reference numeral 30. The crop guard 30 is in the form of an enlarged ring 32 which is reinforced by means of a reinforcing web 34. The reinforcing web 34 is formed of a plurality of interconnected rods 36. The rods 36 have their outer ends secured to the ring 32 and extend inwardly therefrom. The inner ends of the rods 36 are connected to a generally C-shaped centrally disposed member 38 whose outline is best illustrated in Fig. 4.

The C-shaped member 38 includes a recess 40 which receives the threaded portion 24 of the riser pipe 22, as is best shown in Fig. 3. In order that the threaded portion 24 may be retained in the recess 40, there is provided a removable retaining member 42 which is of an inverted U-shape outline and which includes depending legs 44 receivable in openings 46 in the C-shaped member 38. The legs 44 are offset from each other and are connected together by an offset web 48, as is best shown in Fig. 4. The shape of the retaining member 42 is such that the crop guard 30 is firmly mounted on the riser pipe 22 and at the same time the retaining member 42 may be readily removed and replaced.

Referring now to Figs. 5 and 6 in particular, it will be seen that there is illustrated a modified form of crop guard which is referred to in general by the reference numeral 50. The crop guard 50, like the crop guard 30, includes a ring 52 which is reinforced by means of an open web 54. The web 54 includes a plurality of rods 56 which have their outer ends secured to the ring 52 and which extend inwardly therefrom. The inner ends of the rods 56 are connected to an angle bracket 58 which includes a horizontal flange 60, to which the rods 56 are connected, and an upstanding flange 62.

In order that the crop guard 50 may be mounted on the riser 22, there is secured to the upstanding flange 62 and seated on the horizontal flange 60, a spring clip 64. The spring clip 64 includes a yoke portion 66 which is receivable about either the threaded portion 24 of the pipe 22 or about the fitting 26 of the nozzle 28. The spring clip 64 is secured in place by means of a fastener 68 extending through both the spring clip 64 and the upstanding flange 62.

A third form of crop guard is illustrated in Figs. 7 and 8 and is referred to in general by the reference numeral 70. The crop guard 70 includes a ring 72 which is reinforced by means of a web 74. The web 74 is in the form of a plate which is suitably secured to the ring 72 and which is perforated.

In order that the crop guard 70 may be mounted on a sprinkler 20, a portion of the reinforcing web 74 is struck therefrom to form an opening 76. The opening 76 is of a size to permit the passage of the nozzle 28 therethrough. A portion of the material removed to form the opening 76 is struck upwardly to form an upstanding flange 78. Secured to the flange 78 is a spring clip 80 which is identical with the spring clip 64. The spring clip 80 is secured to the flange 78 by means of a fastener 82.

From the foregoing description of the crop guards 30, 50 and 70, it will be seen that the construction thereof is very simple and that they are formed of relatively inexpensive material so that they may be mass produced at a relatively low cost. Further, the connections between the crop guards 30, 50 and 70 and the sprinkler 20 are such that they may be readily inserted in place or removed therefrom with an expenditure of a minimum amount of time. Also, the crop guards are so constructed whereby the possibility of damage thereto is for all practical purposes eliminated. The crop guards are flat and may be readily stored and transported as is required in connection with sprinklers which are constantly being moved. However, it is contemplated that the crop guards may be of a cone shape so that the growing crops may be more readily diverted. When so shaped, the crop guards may be readily nested.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a crop irrigation sprinkler of the type having an upstanding riser pipe with a spray nozzle disposed on the upper portion thereof, a crop guard comprising a ring, a mounting member, means centrally locating and fixedly mounting said member within said ring, said locating and mounting means including means for receiving said spray nozzle and said riser pipe between said ring and said mounting member, said mounting member including a radially extending and outwardly opening recess receiving said riser pipe upon radial movement of the latter and retaining means removably engaging said pipe and preventing its withdrawal from said recess.

2. In combination with a crop irrigation sprinkler of the type having an upstanding riser pipe with a spray nozzle disposed on the upper portion thereof, a crop guard comprising a ring, a mounting member, means centrally locating and fixedly mounting said mounting member within said ring, said mounting member engaging said riser pipe to removably secure said crop guard in position thereon upon radial movement of said crop guard, said locating and mounting means having means for receiving said spray nozzle between said ring and said mounting member, said mounting member comprising a generally C-shaped member and a retaining member engaging said riser pipe and removably carried by said mounting member.

3. The combination of claim 1 wherein said mounting member comprises a spring clip embracing said riser pipe and carried by said ring.

4. The combination of claim 1, said locating and mounting means including an upstanding flange, said mounting member being secured to said flange.

5. In combination with a crop irrigation sprinkler of the type having an upstanding riser pipe with a spray nozzle disposed on the upper portion thereof, a crop guard comprising a ring, a mounting member, means centrally locating and fixedly mounting said mounting member within said ring, said locating and mounting means including means for receiving said spray nozzle and said riser pipe between said ring and said mounting member, said mounting member including a radially extending and outwardly opening recess receiving said riser pipe upon radial movement of the latter and retaining means removably engaging said pipe and preventing its withdrawal from said recess, said locating and mounting means comprising a plurality of interconnected rods secured to said ring.

6. In combination with a crop irrigation sprinkler of the type having an upstanding riser pipe with a spray nozzle disposed on the upper portion thereof, a crop guard comprising a ring, a mounting member, means centrally locating and fixedly mounting said mounting member within said ring, said mounting member engaging said riser pipe to removably secure said crop guard in position thereon upon radial movement of said crop guard, said locating and mounting means having means for receiving said spray nozzle between said ring and said mounting member, said locating and mounting means including an upstanding flange, said mounting member being secured to said flange, said mounting member comprising a generally C-shaped member and a retaining member engaging said riser pipe and removably carried by said mounting member.

References Cited in the file of this patent

UNITED STATES PATENTS

| | | |
|---|---|---|
| 96,773 | Burnham | Nov. 16, 1869 |
| 1,017,594 | Roppeneker et al. | Feb. 13, 1912 |
| 1,080,136 | Campbell | Dec. 2, 1913 |
| 1,962,824 | Lindquist et al. | June 12, 1934 |
| 2,262,873 | Wise | Nov. 18, 1941 |
| 2,530,779 | Owbridge | Nov. 21, 1950 |
| 2,615,580 | Tripp | Oct. 28, 1952 |